United States Patent [19]
Wandelmaier et al.

[11] Patent Number: 5,854,337
[45] Date of Patent: Dec. 29, 1998

[54] AQUEOUS BINDER DISPERSION FOR PHYSICALLY DRYING COATING AGENTS AND THEIR USE

[75] Inventors: Klaus Wandelmaier; Stefan Wiggershaus, both of Wuppertal, Germany

[73] Assignee: Herberts Gesellschaft Mit Beshrankter Haftung, Wuppertal, Germany

[21] Appl. No.: 955,696

[22] Filed: Oct. 22, 1997

[30] Foreign Application Priority Data

Oct. 30, 1996 [DE] Germany ............... 196 43 802.0

[51] Int. Cl.$^6$ .............. C08J 3/00; C08K 3/20; C08L 75/00
[52] U.S. Cl. .......... 524/591; 524/539; 524/839; 524/840
[58] Field of Search ............... 524/591, 839, 524/840, 539

[56] References Cited

U.S. PATENT DOCUMENTS

| | | |
|---|---|---|
| 3,169,945 | 2/1965 | Hostettler et al. . |
| 5,141,987 | 8/1992 | Nachtkamp et al. ............... 524/591 |
| 5,401,795 | 3/1995 | Brock et al. . |
| 5,492,961 | 2/1996 | Brock et al. ............... 524/507 |
| 5,556,912 | 9/1996 | Brock et al. ............... 524/507 |
| 5,635,559 | 6/1997 | Brock et al. ............... 524/839 |
| 5,691,425 | 11/1997 | Klein et al. . |

FOREIGN PATENT DOCUMENTS

| | | |
|---|---|---|
| 0 512 524 | 11/1992 | European Pat. Off. . |
| 0 634 431 | 1/1995 | European Pat. Off. . |
| 0 653 470 | 5/1995 | European Pat. Off. . |
| 39 36 794 | 5/1991 | Germany . |
| 41 15 015 | 11/1992 | Germany . |
| 41 15 042 | 11/1992 | Germany . |
| 41 22 265 | 1/1993 | Germany . |
| 41 22 266 | 1/1993 | Germany . |
| 43 01 991 | 7/1994 | Germany . |
| 43 07 498 | 9/1994 | Germany . |
| 43 39 085 | 5/1995 | Germany . |
| 43 44 063 | 6/1995 | Germany . |

*Primary Examiner*—Patrick D. Niland
*Attorney, Agent, or Firm*—Merchant Gould Smith Edell Welter & Schmidt

[57] ABSTRACT

The invention relates to an aqueous binder dispersion for physically drying coating agents, which contains a mixture of A) 20–80 wt. % of one or more, carbonate group-containing polyurethanes with a number average molecular weight (Mn) of 70,000 to 500,000 in the form of an aqueous dispersion, and B) 20–80 wt. % of one or more carbonate group-free and preferably urea group-free polyurethane resins containing ionic groups, with a number average molecular weight (Mn) of 10,000 to 300,000 and an acid value of 5 to 50, in the form of an aqueous dispersion, the wt. % of the components A) and B), in each case referred to the resin solids, amounting to 100%.

9 Claims, No Drawings

AQUEOUS BINDER DISPERSION FOR PHYSICALLY DRYING COATING AGENTS AND THEIR USE

The present invention relates to water-thinnable binder dispersions, as well as water-based physically drying coating agents containing the dispersions, which are particularly suitable for uni-colour (monochrome) and metallic-colour base layers in a multi-layer lacquer.

In industry and commerce there is a need for physically drying coating agents that are suitable in particular for repair lacquering of various substrates, such as metal objects, especially in the vehicle sector or for lacquering machines. For such purposes coating agents are required that dry and harden at room temperature or when heated slightly, for example to 60° C. For ecological reasons it is desirable to prepare the coating agents in aqueous form.

Such physically drying aqueous coating agents, which for example are suitable for repair lacquering of vehicles, are known for example from DE-A-41 15 015 and DE-A-41 15 042. These coating agents are based on various water-thinnable polyurethane dispersions. The resultant coatings do not however satisfy the necessary quality requirements as regards various properties, for example hardness and water resistance.

Polyurethane ureas as well as their use in aqueous metallic base lacquers are described in DE-A-39 36 794. The binders contain at least 200 milliequivalents per 100 g of solids of chemically incorporated carbonate groups. Base lacquers based on the aforementioned binders have however an inadequate adhesion and unsatisfactory effect formation compared to base lacquers based on solvents.

Furthermore, DE-A-41 22 265 and DE-A-41 22 266 describe polyurethane dispersions that, after conversion to the aqueous phase, are suitable for, inter alia, the preparation of metallic-base and uni-base lacquers. The polyurethane dispersions are produced by free radical-initiated polymerisation of polyurethane macromers with side and/or terminal vinyl groups. The disadvantage of these coating agents is in particular too low a water resistance and an unsatisfactory effect formation achievable under the conditions of the vehicle repair lacquering process.

In EP-A-634 431 further water-thinnable polyurethane dispersions are described, that are obtained by chain extension of a polyurethane prepolymer with polyisocyanates. These dispersions can be used for top coats and base layers in multi-layer lacquering processes. Unsatisfactory water resistances are obtained with the aforedescribed polyurethane dispersions under the special conditions of vehicle repair lacquering and similar applications involving low hardening temperatures. Metallic-base lacquers formulated with these polyurethane dispersions exhibit an inadequate effect formation and unsatisfactory storage stability.

In DE-A-43 44 063 polyurethanes are produced by polymerising polyurethane macromonomers in the presence of unsaturated polymerisable monomers, combined with polyurethane dispersions that are obtained by chain extension of OH-functional polyurethane prepolymers with polyisocyanates. In DE-A-43 39 085 binder mixtures of carbonate group-containing polyurethanes and polyurethanes produced by polymerising polyurethane macromonomers in the presence of unsaturated polymerisable monomers, are used.

Water-based lacquers based on these binders have a poor effect formation.

The object of the invention was therefore to provide water-based binders for physically drying coating agents, which when used as a base lacquer in a multi-layer coating structure exhibit the properties of conventional base lacquers, especially as regards hardness and water-resistance, and which impart to the base lacquer a good metal effect formation as well as a satisfactory running resistance on vertical surfaces. The physically drying coating agents should also have a satisfactory storage stability, which is necessary in automobile repair lacquering, and a high steaming stability in the case of metallic lacquers.

This object is achieved by a water-thinnable binder dispersion containing a mixture of A) 20–80 wt. %, preferably 40–60 wt. %, of one or more carbonate group-containing polyurethanes with a number average molecular weight (Mn) of 70,000 to 500,000, in the form of an aqueous dispersion, obtainable by reacting a) 10–40 wt. % of one or more organic polyisocyanates that have no hydrophilic groups or groups that can be converted into hydrophilic groups, b) 40–80 wt. % of one or more high molecular weight organic polyhydroxy compounds that have no hydrophilic groups or groups that can be converted into hydrophilic groups, and which comprise at least 50 wt. % of one or more polyhydroxy polycarbonates, c) 0.2–18 wt. % of one or more low molecular weight compounds that have at least two groups that can react with isocyanate groups, but have no hydrophilic groups or groups that can be converted into hydrophilic groups, d) 1–12 wt. % of one or more compounds that have, in addition to at least one anionic group or at least one group that can be converted into an anionic group, at least one hydrogen atom that can react with isocyanate groups, and e) 0–8 wt. % of one or more non-ionic hydrophilic compounds that have at least one isocyanate group or at least one group that can react with isocyanate groups, and B) 20–80 wt. %, preferably 40–60 wt. %, of one or more carbonate group-free and preferably urea group-free polyurethane resins containing ionic groups, with a number average molecular weight (Mn) of 10,000 to 300,000 and an acid value of 5 to 50 in the form of an aqueous dispersion obtainable by preparing a OH group-containing polyurethane prepolymer with a OH number of 5 to 75 and a number average molecular weight (Mn) of 5,000 to 50,000, by reacting in an organic medium f) one or more compounds reactive with isocyanate and having an acid value of 0 to 10, in the form of f1) 70 to 100 wt. % of one or more, preferably carboxyl group-free polyester polyols and/or polyether polyols with a molecular weight of 500 to 6,000, together with f2) 0 to 30 wt. % of one or more compounds different from f1) having at least two groups reactive with isocyanate, with a molecular weight of 60 to 400, with g) at least one compound with two groups reactive with isocyanate and at least one anionic group or group capable of forming anions, the component g) being able to be used separately or in the form of a reaction product g1) of component g) and one or more organic diisocyanates g2), the molar ratio of the groups of g) reactive with isocyanate groups to the isocyanate groups of g2) being 1:1.5 to 1:2.5, and the reaction product g1) being able to be prepared also in the presence of component f), and the component g) or the reaction product g1) being used in such an amount that the prepared polyurethane resins have the desired acid value, as well as with h) one or more polyisocyanates with at least two free isocyanate groups per molecule, in such an amount that the molar ratio of the OH groups of component f) to the NCO groups of the components g) and h) is 1.01:1 to 3:1, following which the prepolymer obtained from f), g) and h) is, before or after the partial or complete neutralisation of existing groups that can be converted into ionic groups, subjected to a chain extension in the organic medium or after conversion into the aqueous phase, by reaction with i) one or more polyfunctional isocyanates having a functionality of free NCO groups of at least 1.8, in such proportions that the prepared polyurethane resins have the desired number average molecular weight, the weight percentages of components A) and B) in each case referring to the resin solids and making up 100%.

A further object of the invention is the provision of an aqueous coating agent comprising 8 to 20 wt. % of one or more binder dispersions as described hereinbefore, 50 to 90 wt. % of water, 0 to 20 wt. % of one or more organic solvents, 0.1 to 20 wt. % of one more effect pigments and/or colour-imparting pigments and/or fillers, as well as optionally conventional additives and auxiliary substances.

The binder dispersion according to the invention contains as component A), one or more polyurethanes having carbonate groups. The polyurethanes may optionally also contain urea groups, with the result that they may also be polyurethane ureas.

The polyurethanes used as component A) preferably have at least 200 milliequivalents per 100 g of solids of chemically incorporated carbonate groups —O—CO—O—. They preferably contain not more than a total of 320 milliequivalents per 100 g of solids of chemically incorporated urethane groups —NH—CO—O— and optionally chemically incorporated urea groups —NH—CO—NH—. Examples of such polyurethanes that may be used are described in DE-A-39 36 794.

The component A) of the binder dispersion according to the invention is obtainable by reacting the components a), b), c), d) and optionally e) defined hereinbefore.

The component a) is used in an amount of 10–40 wt. %, preferably 15–35 wt %, referred to the solids content of A). As component a), there may be used conventional aliphatic, cycloaliphatic and/or aromatic polyisocyanates containing at least two isocyanate groups per molecule. The polyisocyanates preferably have a molecular weight of 112 to 1,000, particularly preferably a molecular weight of 140–400. They contain as functional group, preferably two isocyanate groups in the molecule. The isocyanate groups may be arranged symmetrically or asymmetrically. Isomers or isomer mixtures of organic diisocyanates are preferably used. Examples of aromatic diisocyanates that may be used include phenylene diisocyanate, toluylene diisocyanate, xylylene diisocyanate, biphenylene diisocyanate, naphthylene diisocyanate and diphenylmethane diisocyanate.

Particularly suitable are (cyclo)aliphatic diisocyanates, since they yield products having a very low yellowing tendency. Examples of (cyclo)aliphatic diisocyanates are isophorone diisocyanate, cyclopentylene diisocyanate, hydrogenated products of aromatic diisocyanates, for example cyclohexylene diisocyanate, methylcyclohexylene diisocyanate and dicyclohexylmethane diisocyanate. As aliphatic diisocyanates there may be used compounds of the general formula

$$O=C=N-(CR_2)_r-N=C=O$$

where r is an integer from 2 to 20, in particular 6–8, and R denotes hydrogen or a lower alkyl radical with 1–8 C atoms, preferably 1–2 C atoms. Examples of such aliphatic diisocyanates include trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate, and trimethylhexane diisocyanate. Particularly preferred as diisocyanates are isophorone diisocyanate and dicyclohexylmethane diisocyanate. The component a) may also contain a proportion of higher functional polyisocyanates, provided that they do not cause problems due to gel formation. Suitable as triisocyanates are for example products formed by trimerisation or oligomerisation of diisocyanates or by reacting diisocyanates with polyfunctional compounds containing OH or NH groups. Examples include the biuret formed from hexamethylene diisocyanate and water, the isocyanurate of hexamethylene diisocyanate, or the adduct of isophorone diisocyanate and trimethylolpropane. The mean functionality may optionally be reduced by adding monoisocyanates. Examples of such chain-terminating monoisocyanates are phenyl isocyanate, cyclohexyl isocyanate and stearyl isocyanate.

The component b) used to prepare the binder component A) is employed in amounts of 40–80 wt. %, preferably 45–75 wt. %, referred to the solids content of component A). As component b) there may be used organic polyhydroxyl compounds having a molecular weight of preferably 300–5,000, particularly preferably of 500–3,000. The component b) contains at least 50 wt. %, preferably more than 70 wt. %, of polyhydroxy polycarbonates of the aforementioned molecular weight range. The term polyhydroxy polycarbonates denotes esters of carbonic acid obtained by reacting carbonic acid derivatives, for example diphenyl carbonate or phosgene, with diols. Examples of diols that may be used include ethylene glycol, propanediol-1,2, propanediol-1,3, butanediol-1,3, butanediol-1,4, hexanediol-1,6, octanediol-1,8, neopentyl glycol, 2-methyl-1,3-propanediol, 1,4-bishydroxymethylcyclohexane, 2,2,4-trimethyl-1,3-pentanediol, and in addition diethylene glycol, triethylene glycol, tetraethylene glycol, dipropylene glycol, polypropylene glycols, dibutylene glycol, polybutylene glycols and bisphenol A. The diol component used in the preparation of the polyhydroxy polycarbonates preferably contains 40–100 wt. % of hexanediol, preferably hexanediol-1,6 and/or hexanediol derivatives, preferably those that contain ether or ester groups in addition to terminal OH groups.

Preferably the polyhydroxy polycarbonates should be substantially linear. They may however also be slightly branched by the incorporation of polyfunctional components, especially low molecular weight polyols. Suitable low molecular weight polyols are for example glycerol, trimethylolpropane, hexanetriol-1,2,6, butanetriol-1,2,4, trimethylpropane, and pentaerythritol.

In addition to the polyhydroxy polycarbonates the component b) may also contain other polyhydroxyl compounds in the specified molecular weight range and known per se from polyurethane chemistry. Examples of such compounds are:

Dihydroxypolyesters of dicarboxylic acids, for example of succinic acid, adipic acid, sebacic acid, suberic acid, azelaic acid, isophthalic acid, terephthalic acid, tetrahydrophthalic acid, and diols, for example ethylene glycol, propanediol-1,2, propanediol-1,3, diethylene glycol, butanediol-1,4, hexanediol-1,6, octanediol-1,8, neopentylglycol, 2-methylpropanediol-1,3, or the various isomeric bishydroxymethyl-cyclohexanes.

Polylactones, for example the polymers of epsilon caprolactones started on the aforementioned dihydric alcohols.

Polyethers, for example the polymers or copolymers of tetrahydrofuran, propylene oxide, ethylene oxide, butylene oxides or epichlorohydrin, prepared using difunctional starter molecules such as water, the aforementioned diols, or amines having two NH bonds.

The polyether diols should preferably contain at most 10 wt. % of ethylene oxide units. Polyether diols based on propylene oxide and tetrahydrofuran are preferred.

The preparation of the binder component A) involves the co-use of the component c). The component c) is used in amounts of 0.2–18 wt. %, preferably 0.5–10 wt. %, referred to the solids content of A). The component c) involves for example the low molecular weight compounds known from polyurethane chemistry and containing at least difunctional hydroxyl and/or amino groups and having molecular weights of for example 60–400. During the isocyanate addition they serve as chain extenders (when using difunctional compounds) or as crosslinking agents (when using trifunctional or polyfunctional compounds). The functional groups may be joined via aliphatic, aromatic or alicyclic radicals.

Examples of low molecular weight polyols are low molecular weight polyhydric alcohols with for example up to 20 C atoms in the molecule, such as ethylene glycol, diethylene glycol, triethylene glycol, 1,2-propanediol, 1,3-propanediol, 1,4-butanediol, 1,6-hexanediol, neopentyl glycol, trimethylolpropane, castor oil, 1,2-cyclohexanediol, 1,4-cyclohexanedimethanol, bisphenol A, bisphenol F or pentaerythritol. Examples of low molecular weight polyamines are alkylene polyamines with 1–30 C atoms, preferably with 2–12 C atoms. Preferred are polyamines with linear or branched aliphatic, cycloaliphatic or aromatic structure and containing at least two primary amino groups. Suitable polyamines are diamines such as ethylenediamine, propylenediamine, 1,4-butylenediamine, piperazine, 1,4-cyclohexyldimethylamine, hexamethylenediamine-1,6, isophorone diamine, 4,4'-diaminodicyclohexylmethane, 4,4'-diamino-3,3'-dimethyldicyclohexylmethane. Hydrazine and substituted hydrazides may also be used. Higher functional polyamines containing at least three amino groups may also at least to some extent be used. Examples of such compounds are diethylenetriamine, triethylenetetramine, dipropylenetriamine, tripropylenetetramine and dibutylenetriamine.

The component d) is also used in the preparation of the binder component A). This component d) is used in amounts of 1–12 wt. %, preferably 1.5–6 wt. %. The component d) involves compounds containing at least one, preferably two hydrogen atoms that can react with isocyanate groups, and at least one anionic group or group that can be converted into an anionic group. Suitable groups that react with isocyanate are in particular hydroxyl groups as well as primary and/or secondary amino groups. Groups capable of forming anions are carboxyl, sulphonic acid and/or phosphonic acid groups. Preferred components d) are dihydroxyalkanoic acids, for example dihydroxypropionic acid, dihydroxysuccinic acid, and dihydroxybenzoic acid. Particularly preferred are the alpha, alpha-dimethylolalkanoic acids of the general formula

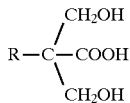

where R denotes hydrogen or an alkyl group containing up to 20 C atoms. Examples of such compounds are 2,2-dimethylolacetic acid, 2,2-dimethylolpropionic acid, 2,2-dimethylolbutyric acid and 2,2-dimethylolpentanoic acid. 2,2-dimethylolpropionic acid is preferred.

Amino group-containing compounds are for example diaminovaleric acid, diaminobenzoic acid and 2,4-diaminotoluenesulphonic acid. The amount of component d) should preferably be chosen so as to produce in the unneutralised polyurethane resin A) an acid value of at least 5, preferably at least 10, and so that the upper limit of the acid value is 60, preferably 40 (referred to solids).

The component e) may optimally be used to prepare the binder component A). The component e) is used in amounts of 0–8 wt. %, preferably 0.5–6 wt. %. The component e) involves for example compounds having polyethylene oxide units incorporated within polyether chains and containing at least one isocyanate group or at least one group that can react with isocyanate groups. Such compounds are for example e1) diisocyanates and/or difunctional compounds containing hydrogen atoms that can react with isocyanate groups and that have side chains containing lateral ethylene oxide units, or are for example e2) monoisocyanates and/or monofunctional compounds containing hydrogen atoms that can react with isocyanate groups, and which contain polyether chains having ethylene oxide units. Mixtures of e1) and e2) may also be used.

The carbonate group-containing polyurethanes A) may be prepared in a manner known per se in one or several stages from the components a) to e). The quantitative ratios of the reactants are chosen so that the equivalent ratio of the isocyanate groups of component a) and optionally of component e) to groups of the components b), c), d) and optionally e) that can react with isocyanate groups is 0.8:1 to 2:1, preferably 0.95:1 to 1.5:1. The component e) is used in such an amount that the resultant polyurethane A) contains 0–30 wt. %, preferably 1–20 wt. % of ethylene oxide units incorporated in polyether chains. The amount of the component d) and the degree of neutralisation of the ionic groups incorporated with the component d) are chosen so that the finally obtained polyurethane A) contains 0–120 milliequivalents, preferably 1–80 milliequivalents per 100 g of solids of ionic groups, the total amount of ethylene oxide units and ionic groups being adjusted within the aforementioned ranges so as to ensure the dispersibility of the polyurethanes in water. Various ways of preparing the polyurethanes A) are described for example in DE-A-39 36 794.

The binder component B) according to the invention are polyurethanes that contain no carbonate groups and preferably no urea groups. The component f1) is used in the preparation of the binder component B) according to the invention. The component f1) is preferably a polyol component with terminal OH groups. Polyether polyols of the general formula I may for example be used as component f):

$$H-[O-(CHR^1)_n-]_mOH \qquad (I)$$

where $R^1$=hydrogen or a lower alkyl radical, for example with 1 to 6 or 1 to 4 C atoms, optionally with one or more substituents, n=2 to 6, preferably 3 to 4, and
m=at least 5, for example 5 to 50.

Examples of suitable polyether polyols include poly(oxytetramethylene)glycols, poly(oxyethylene)glycols and poly(oxypropylene) glycols.

Preferably those polyether polyols are used having a molecular weight in the range from 500 to 3,000, and which can be prepared without the co-use of ethylene oxide, in other words are prepared in particular with the exclusive use of propylene oxide or tetrahydrofuran. The OH number is preferably 40 to 220.

The component f1) may also comprise hydrophilic polyols with one or two hydrogen atoms that can react with isocyanates and that carry, in the side chain, polyether chains containing ethylene oxide, or mixtures thereof. These produce a better dispersion of the polyurethanes in the aqueous phase.

Furthermore, polyester polyols may be used as component f1). The polyester polyols may be prepared for example by esterification of organic dicarboxylic acids or their anhydrides with organic polyols. The dicarboxylic acids and the polyols may be aliphatic or aromatic dicarboxylic acids and polyols.

The polyols used to prepare the polyester polyols are for example diols such as alkylene glycols, for example ethylene glycol, butylene glycol, neopentyl glycol and other glycols such as dimethylolcyclohexane. In addition very small amounts of higher functional OH components or mixtures of higher functional and monofunctional OH components may also be used, for example trimethylolpropane, pentaerythritol, glycerol, hexanetriol; polyethers that are condensates of glycol and alkylene oxides; monoethers of such glycols, such as diethylene glycol monoethyl ether and tripropylene glycol monomethyl ether.

The acid component of the polyester polyol preferably consists primarily of low molecular weight dicarboxylic acid or their anhydrides with for example 2 to 18 carbon atoms in the molecule.

Suitable acids are for example phthalic acid, isophpthalic acid, terephthalic acid, tetrahydrophthalic acid, hexahydrophthalic acid, adipic acid, azelaic acid, sebacic acid, fumaric acid, maleic acid, glutaric acid, succinic acid or itaconic acid. Instead of these acids their anhydrides, insofar as they exist, may also be used. It is also possible to obtain branched polyesters, and to add proportions of trifunctional carboxylic acids, such as trimellitic acid, malic acid, aconitic acid, bishydroxyethyltaurine, as well as dimethylolpropionic acid.

The polyester polyols preferably have a molecular weight of 400 to 6,000, a OH number of 20 to 280, and an acid value of less than 3. Linear polyester polyols are preferably used.

Furthermore, there may also be used as component f1) polyester polyols, preferably diols, that are derived from lactones. These products are obtained for example by reacting an epsilon-caprolactone with a diol. Such products are described for example in U.S. Pat. No. 3,169,945.

The polylactone polyols that are obtained by this reaction are characterised by the presence of a terminal hydroxyl group and by repeating polyester units that are derived from the lactone. These repeating molecular units may correspond to the formula

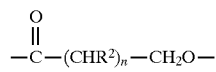  (II)

in which n is preferably 4 to 6 and the substituent $R^2$ is hydrogen, an alkyl radical, a cycloalkyl radical or an alkoxy radical, no substituent containing more than 12 carbon atoms and the total number of carbon atoms in the substituent in the lactone ring not exceeding 12.

The lactone used as a starting material may be any suitable lactone or any suitable combination of lactones. The lactone should contain for example 6 to 8 carbon atoms and at least two hydrogen substituents should be present on the carbon atom that is bonded to the oxygen group of the ring. The lactone used as starting material may be represented by the following general formula III:

  (III)

in which n and $R^2$ have the meaning specified hereinbefore.

Preferred lactones for the preparation of the polyester diols are the epsilon-caprolactones, in which n has the value 4. The most preferred lactone is the unsubstituted epsilon-caprolactone in which n has the value 4 and all $R^2$ substituents are hydrogen. This lactone is particularly preferred since it is available in large quantities and produces coatings having excellent properties. In addition various other lactones may be used, either individually or in combination.

Suitable aliphatic diols for the reaction with the lactones are for example ethylene glycol, 1,3-propanediol, 1,4-butanediol and dimethylolcyclohexane.

Sequenced polyols f1) of polyethers and polyesters may also be used.

The polyols f1) are substantially free from carboxyl groups, in other words only very small amounts of unreacted COOH groups are present. The acid value is preferably below 10 mg KOH/g, and is in general below 5 mg KOH/g. These very small amounts of optionally ionic groups do not contribute to the stabilisation of the aqueous dispersion.

Mixtures of various polyols f1) may also be used.

The low molecular weight compounds f2) that are optionally co-used are for example low molecular weight alcohols. They are compounds of molecular weight below 400 known per se from polyurethane chemistry in the context of isocyanate addition reactions and contain at least difunctional hydroxyl groups. Suitable compounds are difunctional compounds in the context of the isocyanate addition reaction as well as compounds that are at least trifunctional, or arbitrary mixtures of such compounds. In particular it is preferred to use diols in the reaction.

Examples of the component f2) are low molecular weight polyhydric alcohols such as ethylene glycol, propanediol-1,2 and -1,3, butanediol-1,4 and -1,3, hexanediol-1,6, octanediol-1,8, neopentylglycol, 1,4-bishydroxymethylcyclohexane, 2-methyl-1,3-propanediol, 2,2,4-trimethylpentanediol-1,3, trimethylolethane, isomeric hexanetriols or pentaerythritol, or mixtures thereof. Such polyol compounds have in particular a molecular weight below 400.

The amount of the low molecular weight compounds f2) may be up to 30 wt. % referred to f1). The degree of branching may be controlled by the amount of higher functional polyols. Care should be taken however to avoid crosslinking reactions as far as possible.

According to the invention, the component g) is used in the preparation of the polyurethane dispersion B). The component g) may be used separately or in the form of a reaction product g1) of the component g) and one or more diisocyanates g2).

The component g) are compounds with isocyanate-reactive groups and anionic groups or groups capable of forming anions. Suitable groups that react with isocyanate groups are in particular non-ionic groups such as hydroxyl groups, thiol groups, and primary and secondary amino groups. Groups capable of forming anions are for example carboxyl, phosphonic acid and sulphonic acid groups. Suitable compounds that contain at least two groups that can react with isocyanates and at least one group capable of forming anions are for example dihydroxy acids and diamino acids. Suitable dihydroxy acids are for example dihydroxycarboxylic acids such as dihydroxypropionic acid, dimethylolpropionic acid, dimethylolacetic acid, dimethylolbutyric acid, dihydroxysuccinic acid, or dihydroxybenzoic acid. Also suitable are the polyhydroxy acids accessible by oxidising monosaccharides, for example gluconic acid, saccharic acid, mucic acid, glucuronic acid, and the like. Amino group-containing compounds are for example diaminocarboxylic acids, such as alpha, delta-diamino valeric acid, 3,4-diaminobenzoic acid, 2,4-diaminotoluenesulphonic acid-(5) and 4,4-diaminodiphenylethersulphonic acid. Compounds containing phosphoric acid groups are for example 2,2-dimethylolpropanephosphonic acid, or diethanolamide methanephosphonic acid. The dihydrocarboxylic acids are preferred, dimethylolpropionic acid being particularly preferred.

A preferred method of preparing the polyurethane dispersion B) consists in using the component g) in the form of a reaction product g1) of component g) and one or more diisocyanates g2). NCO-terminated compounds are formed as reaction product g1). These compounds are essentially low molecular weight compounds in which the molar ratio of the non-ionic reactive groups of g) to the isocyanate groups of g2) is 1:1.5 to 1:2.5. Preferably the ratio is approximately 1:2. The resultant compounds g1) are also readily soluble in organic solvents. The reaction is preferably carried out in liquid form, in other words amounts of organic unreactive solvents may optionally be present. The temperature may optionally be raised somewhat to promote the reaction.

The compounds g1) may be added as a separate component. It is however also possible to prepare g1) in situ in the mixture, in the presence of f), and to react it further. Any suitable organic diisocyanates or their mixtures may be used as component g2) for the reaction. Aliphatic or aromatic, as well as sterically hindered isocyanates or oligomerised isocyanates may for example be used. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 2,4-toluylene diisocyanate, 2,6-toluylene diisocyanate, 1-isocyanatomethyl-5-isocyanato-1,3,3-trimethylcyclohexane, bis-(4-isocyanatocyclohexyl)methane, bis-(4-isocyanatophenyl)methane, 4,4-diisocyanatodiphenyl ether, 1,5-dibutylpentamethylene diisocyanate, tetramethylxylylene diisocyanate and 2,3-bis-(8-isocyanatooctyl)-4-octyl-5-hexylcyclohexane.

The component g) and/or reaction product g1) is used in such an amount that the resultant polyurethane prepolymer has an acid value of 5–50 mg KOH/g, preferably between 15–40 mg KOH/g. Phosphonic acids and sulphonic acids may be used in appropriate amounts.

The component g) and/or the reaction product g1) may for example be used in an amount of about 0.5 to 7 wt. %, preferably about 0.8 to about 4.0 wt. % (calculated as carboxyl group), referred to the urethane prepolymer being prepared. If the carboxyl group amount is below about 0.5 wt. %, it is difficult to prepare a stable emulsion. If on the other hand the amount exceeds 7 wt. %, the hydrophilic property is intensified, which makes the emulsion highly viscous and reduces the water resistance of the coating.

The stabilisation of the aqueous dispersion is achieved by ionic groups. However, ionic and non-ionic groups may also be used jointly. A stabilisation achieved only by anionic groups is preferred.

Any suitable organic diisocyanates, optionally also as a mixture, may be used as component h) for the preparation of the polyurethane dispersion B). These diisocyanates may for example be the diisocyanates or oligomeric isocyanates mentioned under g2). It is preferred to use non-yellowing or sterically hindered isocyanates with 4 to 25, preferably 6–16 C atoms, which contain in the alpha position to the NCO group one or two linear, branched or cyclic alkyl groups with 1 to 12, preferably 1 to 4 C atoms. The skeleton may for example comprise an aromatic or alicyclic ring or an aliphatic linear or branched carbon chain with 1 to 12 C atoms. Examples of suitable skeletons are isophorone diisocyanate, 4,4'-diphenylpropane diisocyanate, xylylene diisocyanate, 1,1,6,6-tetramethylhexamethylene diisocyanate, p- and m-tetramethylxyxlylene diisocyanate and the corresponding hydrogenated homologues.

It is also possible to use for the reaction polyisocyanates in which the preponderant proportion of isocyanate groups has been irreversibly defunctionalised. Examples of suitable compounds for the defunctionalisation are low molecular weight, primary or secondary amines or alcohols.

The amounts of f), g) and h), and/or of f1), f2), g1) and h) are chosen so that a reaction product with terminal OH groups is formed in the reaction, in other words an excess of polyol is used. Although the reaction can be carried out with a OH to NCO ratio of 1.01 to 3:1, the range is preferably 1.05 to 2:1, and particularly preferably 1.1 to 1.5:1. The reaction product may be branched, but preferably has a linear structure. The reaction products have a number average molecular weight (Mn) of 5,000–50,000, preferably above 8,000 and below 30,000, and a OH number of 5–75 mg KOH/g, preferably over 10 and below 50 mg KOH/g. The reaction may be carried out in a mixture of all the components, or may be carried out stepwise.

The reaction may be carried out without the use of solvents, but may however also be carried out in solvents known to the person skilled in the art to be suitable for polyurethane synthesis. The solvents may remain in the reaction mixture or may optionally be distilled off under reduced pressure before the reaction mixture is worked up. Further additional solvents may also be added in order to reduce the viscosity of the polymer solution.

Suitable solvents are those that do not interfere in the reaction of the isocyanates. Examples of suitable solvents are aromatic hydrocarbons such as benzene, toluene, xylene, esters such as ethyl acetate, butyl acetate, methyl glycol acetate, ethyl glycol acetate, methoxypropyl acetate, ethers such as tetrahydrofuran, dioxane, fully etherified monoglycols or diglycols of ethylene glycol or propylene glycol, such as diethylene glycol or dipropylene glycol dimethyl ether, ketones such as acetone, methyl ethyl ketone, halogenated solvents such as methylene chloride or trichloromonofluoroethane. Solvents are preferred that facilitate dispersion in the aqueous phase. Also preferred are solvents that do not subsequently exhibit any negative properties in the coating agents according to the invention.

The OH-functionalised polyurethane prepolymer is chain-extended as an intermediate product by reaction with further polyisocyanates i). These are for example mixed homogeneously with the functionalised intermediate product and are then reacted, optionally by heating or assisted by catalysts conventionally used in NCO chemistry, for example dibutyl tin dilaurate (DBTL) and amine derivatives. This can take place in the organic or aqueous phase before or after the salt formation of the groups convertible into anionic groups; the reaction is preferably carried out after neutralisation in the organic phase.

As polyisocyanates there may for example be used polyisocyanates or diisocyanates known in the lacquering sector, such as have also been described hereinbefore for the components g2) and h). These polyisocyanates may be aliphatic, cycloaliphatic or aromatic, and preferably have a molecular weight of less than 1,200.

As polyisocyanates i), low molecular weight NCO-terminated prepolymers are also suitable. These compounds are preferably difunctional. Their molecular weight is preferably below 1,000.

The groups convertible into anionic groups are neutralised before or after the chain extension. Bases, for example ammonia or amines, are used for this purpose. Suitable amines are primary, secondary or tertiary amines, for example trialkylamines such as trimethylamine, triethylamine, triisopropylamine, tri-n-propylamine and tri-n-butylamine; N-alkylmorpholines such as N-methylmorpholine and N-ethylmorpholine; N-dialkylalkanolamines such as N-dimethylethanolamine and N-diethylethanoalmine; dialkylamines such as diethylamine, dibutylamine, diisopropylamine; alkylamines such as ethylamine, hexylamine, isopropylamine, aminoethanol; mixtures of at least two of these compounds. In general between 30% and 100% of the acidic groups are converted into salt groups.

The aqueous dispersion may be prepared by processes known per se.

Examples of aqueous polyurethane dispersions B) as well as their preparation are described for example in EP-A-634 431.

The polyurethane dispersion B) has an acid value of 5 to 50 (referred to the solids), preferably of 15 to 35, particularly preferably of 15–25. The solids content is for example 25 to 55 wt. %. The number average molecular weight (Mn) of the binders is 10,000 to 300,000, preferably 50,000 to 200,000, particularly preferably 40,000 to 100,000. The polyurethanes may optionally also contain further functional groups, for example OH groups. The resultant dispersions have for example a mean particle size of between 10–1,000 nm, preferably 30–500 nm, particularly preferably 30–150 nm.

Aqueous coating agents can be formulated from the binder mixture according to the invention comprising the components A) and B). The coating agents contain 8 to 20 wt. %, referred to the total coating agent, of the binder mixture according to the invention.

The coating agents prepared from the binder mixture according to the invention contain 50 to 90 wt. %, preferably 60 to 85 wt. % of water. In order to improve the rheology of the film formation and of the metallic effect, the coating agents may contain 1 to 20 wt. %, preferably 6 to 15 wt. %, in each case referred to the total coating agent, of one or more solvents.

Suitable solvents are organic solvents such as are conventionally used in the lacquering sector as lacquer solvents and/or additives to aqueous coating agents.

Examples of suitable solvents are aromatic solvents such as xylene, esters such as butyl acetate, glycol ethers such as ethylene glycol monobutyl ether (butyl glycol), alcohols such as butanol, and aliphatic hydrocarbons, for example white spirit.

The coating agents may contain conventional inorganic and/or organic colour pigments and/or fillers, as well as transparent pigments. Examples of inorganic or organic colour pigments or fillers are titanium dioxide, micronised titanium dioxide, iron oxide pigments, carbon black, silicon dioxide, barium sulphate, micronised mica, talcum, azo pigments, phthalocyanine pigments, quinacridone pigments or pyrrolopyrrole pigments.

The coating agents may also contain effect pigments. The effect pigments are characterised in particular by a platelet-like structure. Examples of effect pigments are: metal pigments, for example of aluminium, copper or other metals; interference pigments, such as metal oxide-coated metal pigments, for example titanium oxide-coated or mixed oxide-coated aluminium, coated mica, for example titanium dioxide-coated mica, and graphite effect pigments.

The coating agents may in addition contain lacquer additives, for example rheology-influencing agents such as highly dispersed silicic acid, layered silicates or polymeric urea compounds. Thickening agents that may be used include for example water-soluble cellulose ethers as well as synthetic polymers with ionic groups and/or associatively acting groups, such as modified ethoxylated polyurethanes or polyacrylates and polypeptides. In addition to the above, anti-settling agents, flow control agents, light stabilisers, anti-foam agents such as silicone-containing compounds, wetting agents as well as coupling substances may also be used.

These additives and auxiliary substances are added in conventional amounts known to the person skilled in the art and depending on the desired effect.

The coating agents according to the invention may contain neutralising agents for the complete or partial neutralisation of neutralisable groups. The degree of neutralisation of neutralisable groups is preferably 40 to 120% of the neutralisable groups, and is preferably below 100%.

Suitable neutralising agents for the acid groups are bases conventionally used in the lacquer sector. Examples of such bases are ammonia or organic amines such as triethylamine, N-methylmorpholine, and aminoalcohols such as dimethylisopropanolamine, dimethylethanolamine and 2-amino-2-methylpropanol-1.

It is possible to add small amounts of further water-thinnable binders to the coating agents, such as are conventionally used in the preparation of base layers in the vehicle lacquering sector.

The water-thinnable coating agents prepared from the binder dispersions according to the invention may be produced by methods known per se. Optionally the solids content, the pH and the viscosity of the coating agent are adjusted in the conventional way. The coating agents may be produced by means of substrate fabrication or by means of a module system, such as are described in DE-A-43 07 498 and DE-A-43 01 991.

The coating agents produced from the binder dispersions according to the invention are physically drying, i.e. they do not require stoving and may for example be dried at room temperature or at higher temperatures up to 80° C., preferably up to 60° C.

The binder dispersions according to the invention are particularly suitable for producing coating agents for colour-imparting and/or effect-imparting base layers in a multi-layer lacquer. It is however also possible to prepare other coating agents, for example primers or fillers, from these binder dispersions. The choice of pigments and additives as well as their concentrations is matched to the respective intended use. The preferred area of use is the vehicle and vehicle parts lacquering sector. The coating agents can be used for vehicle repair lacquering as well as for vehicle production line lacquering. On account of the low hardening temperatures, it is preferred to use the coating agents for vehicle repair lacquering.

The invention also relates to a process for producing a multi-layer coating in which a colour-imparting and/or effect-imparting base lacquer layer prepared from the coating agents according to the invention is applied to an optionally precoated substrate, following which a clear lacquer layer is applied to this base lacquer layer, either after drying or hardening or wet-in-wet, and optionally after brief drying in air. Suitable clear lacquers are in principle all known unpigmented or transparently pigmented coating agents, such as are conventionally used in the vehicle sector. Solvent-based or water-based clear lacquers are suitable in this connection.

After application the clear lacquer and base lacquer layers are dried and hardened, preferably together. This is carried out at temperatures of for example 20°–150° C. For vehicle repair lacquering temperatures of 20°–80° C. are preferred, while for vehicle production line lacquering temperatures of over 100° C. are employed. Application is by conventional methods, preferably by spraying.

Suitable substrates are metal and plastics substrates, in particular the substrates known in the automobile industry, for example iron, zinc, aluminium, magnesium or their alloys, as well as polyurethanes, polycarbonates or polyolefins.

The coating agents produced from the binder dispersions according to the invention are stable to steaming and have a long-term storage stability of at least 24 months. The resultant coatings have a very good hardness and water-resistance. An adequate resistance to running on vertical surfaces is obtained, and formulated metallic base lacquers exhibit a very good metal effect formation.

The invention will be illustrated in more detail hereinafter by the following examples.

PRODUCTION EXAMPLE 1

Polyurethane dispersion A)

A prepolymer containing about 5% of free isocyanate groups is prepared from 850 parts of a polycarbonate of hexanediol-1,6 (prepared by reacting hexanediol-1,6 and diphenyl carbonate, OH number 56 mg KOH/g, molecular weight ca. 2,000), 67.5 parts of a monofunctional polyether alcohol with a OH number of 26 mg KOH/g, prepared by alkoxylation of n-butanol using a mixture of 83% of ethylene oxide and 17% of propylene oxide, 21.4 parts of 2,2-bishydroxymethylpropionic acid and 22.5 parts of butanediol-1,4, by reacting at 100° C. with a mixture of 151.2 parts of 1,6-diisocyanatohexane and 199.8 parts of isophorone diisocyanate. The prepolymer obtained is dissolved in 2440 parts of acetone; the solution is cooled to 50° C.

A solution of 19.8 parts of ethylenediamine and 7.5 parts of hydrazine hydrate is prepared in 500 parts of water. This solution is slowly added to the prepolymer solution, while stirring thoroughly; a highly liquid, whitish-turbid solution is formed. 13,4 parts of N,N-dimethylethanolamine are now added. 1525 parts of deionised water are then added, while stirring vigorously; an opaque blue-white dispersion is formed. The acetone is removed from this dispersion by vacuum distillation. A purely aqueous dispersion containing 40 wt. % of solids remains.

The solids proportion contains:

410 mEq carbonate groups (—O—CO—O—)

148 mEq urethane groups (—NH—CO—O—)

95 Meq urea groups (—NH—CO—NH—)

mEq=milliequivalents per 100 g of solids.

PRODUCTION EXAMPLE 2

Polyurethane dispersion B)

582 g of a commercially available polyester ($M_n$=1,000, OH number=106), 28.7 g of dimethylolpropionic acid (DMPA) and 124 g of N-methylpyrrolidone (NMP) are mixed and dissolved at 80° C. The mixture is then cooled to 50° C. 139 g of isophorone diisocyanate (IPDI) are added to the mixture, which is heated to 80° C., and 125 g of NMP are then added. The mixture is reacted until the NCO value is <0.1%.

34.5 g of IPDI are added at 50° C. to the reaction product and reacted at 80° C. until the NCO value is <0.1%. 33.2 g of dimethylisopropanolamine solution (50% in water) are then added while stirring. Following this 1174 g of fully desalted water are slowly added at 80° C. while stirring thoroughly. The mixture is homogenised for 3 hours.

FK: 36.3% (measured in circulating air oven,
 30 min. at 150° C.)

SZ: 16.7 mg KOH/g (solids)

MEQ-amine: 19.0 (milliequivalents per 100 g of solids)

FK=solids content, SZ=acid value, MEQ=milliequivalents.

PRODUCTION EXAMPLE 3

Production of metallic water-based lacquers

Aqueous metallic base lacquers containing the following constituents are produced from the dispersions A and B prepared as above:

19.7 parts dispersion A)+21.6 parts dispersion b)

43.5 parts water 3.3 parts n-butanol 3.8 parts butyl glycol 0.5 part N-methylpyrrolidone 0.4 part of a commercially available bronze stabiliser 2.5 parts of a commercially available thickening agent 0.2 part N,N-dimethyleneethanolamine 5.0 parts of a conventional aluminium paste (60% Al)

PRODUCTION EXAMPLE 4

Production of uni-water base lacquers

Aqueous uni-base lacquers containing the following constituents are produced from the dispersions A) and B) prepared as above:

17.0 parts dispersion A) and 18.4 parts dispersion B)

28.5 parts water 3.7 parts butyl glycol 1.28 parts of a commercially available thickening agent 0.2 part N,N-dimethylethanolamine 18.6 parts of a commercially available titanium dioxide pigment 0.4 part of a commercially available copper phthalocyanine pigment
0.12 part of a commercially available defoaming agent
10.0 parts of a commercially available grinding auxiliary substance (solids 30%)
1.8 parts n-butanol

PRODUCTION EXAMPLE 5

Production of comparison water base lacquers 5.1 Metallic water base lacquer with dispersion A)
39.3 parts dispersion A)
45.5 parts water
3.8 parts butyl glycol
3.3 parts n-butanol
2.5 parts of a commercially available thickening agent
0.2 part N,N-dimethylethanolamine
5 parts of a commercially available aluminium paste for water-based lacquers
0.4 part of a commercially available bronze stabiliser
5.2 uni-water base lacquer with dispersion A)
34 parts dispersion A)
30 parts water
3.7 parts butyl glycol
1.8 parts n-butanol
1.18 parts of a commercially available thickening agent
0.2 part N,N-dimethylethanolamine
18.6 parts of a commercially available titanium dioxide pigment
0.4 part of a commercially available copper phthalocyanine pigment
0.12 part of a commercially available defoaming agent
10 parts of a commercially available PU grinding auxiliary substance (solids 30%)
5.3 metallic water base lacquer with dispersion B)
43 parts dispersion B)
41.8 parts water
3.8 parts butylglycol
3.3 parts n-butanol
2.5 parts of a commercially available thickening agent
0.2 part of N,N-dimethylethanolamine
5 parts of a commercially available aluminium paste for water base lacquers
0.4 part of a commercially available bronze stabiliser 5.4 Uni-water base lacquer with dispersion B)
37.3 parts dispersion B)
26.6 parts water
3.7 parts butyl glycol
1.8 parts n-butanol
1.28 parts of a commercially available thickening agent
0.2 part N,N-dimethylethanolamine
18.6 parts of a commercially available titanium dioxide pigment
0.4 part of a commercially available copper phthalocyanine pigment
0.12 part of a commercially available defoaming agent
10 parts of a commercially available PU-grinding auxiliary substance (solids 30%)
5.5 metallic water base lacquer corresponding to DE-A-41 15 015

EXAMPLE 3 AND PRODUCTION EXAMPLE 3

Application of the water base lacquer and comparison water base lacquer.

The following lacquers were produced with the water base lacquers that were obtained:
Lacquer structure on the assessed metal sheets:
Bright-ground car body sheet
Conventional 1-component polyvinylbutyral primer
Conventional two-component polyurethane filler
Water base lacquer
Conventional solvent-based two-component polyurethane clear lacquer, medium solid type, solids 47%
Application and drying of the base lacquer and clear lacquer:
Spray application of the water base lacquer
30 minutes' pre-drying at room temperature
Spray application of clear lacquer
10 minutes' drying in air at room temperature
30 minutes' drying at 60° C.
The properties of the lacquers obtained are shown in the following Table:

|  | Water resistance | | Hardness | | Storage stability | | Metallic effect |
| --- | --- | --- | --- | --- | --- | --- | --- |
|  | metallic | uni | metallic | uni | metallic | uni |  |
| Dispersion A + B | 2 | 2 | 2 | 1–2 | 1–2 | 2 | 1–2 |
| Dispersion A (Comp.) | 2–3 | 3 | 2 | 2–3 | 2 | 3 | 4 |
| Dispersion B (Comp.) | 2–3 | 2–3 | 2 | 2–3 | 3 | 4 | 4 |
| Dispersion Comp. - Ex. 5.5 | 3 |  | 3 |  | 3 |  | 2–3 |

Evaluation:
1 very good
2 good
3 usable
4 unusable

We claim:

1. An aqueous binder dispersion for physically drying coating agents containing a mixture of:

A) 20–80 wt. % of one or more, carbonate group-containing polyurethanes with a number average molecular weight (Mn) of 70,000 to 500,000, in the form of an aqueous dispersion, obtained by reacting a) 10–40 wt. % of one or more organic polyisocyanates that have no hydrophilic groups or groups that will convert into hydrophilic groups, b) 40–80 wt. % of one or more high molecular weight organic polyhydroxy compounds that have no hydrophilic groups or groups that will convert into hydrophilic groups, and which comprise at least 50 wt. % of one or more polyhydroxy polycarbonates, c) 0.2–18 wt. % of one or more low molecular weight compounds that have at least two groups that will react with isocyanate groups, but have no hydrophilic groups or groups that will convert into hydrophilic groups, d) 1–12 wt. % of one or more compounds that have at least one anionic group or at least one group that will convert into an anionic group, and at least one hydrogen atom that will react with isocyanate groups, and e) 0–8 wt. % of one or more non-ionic hydrophilic compounds that have at least one isocyanate group or at least one group that will react with isocyanate groups, the sum of the components a) to e) being 100 wt. %, and B) 20–80 wt. % of one or more carbonate group-free polyurethane resins containing ionic groups, with a number average molecular weight (Mn) of 10,000 to 300,000 and an acid value of 5 to 50, in the form of an aqueous dispersion obtained by preparing a OH group-containing polyurethane prepolymer with a OH number of 5 to 75 and a number average molecular weight (Mn) of 5,000 to 50,000, by reacting in an organic medium f) one or more compounds reactive with isocyanate and having an acid value of 0 to 10, in the form of f1) 70 to 100 wt. % of one or more polyester polyols and/or polyether polyols with a molecular weight of 500 to 6,000, together with f2) 0 to 30 wt. % of one or more compounds different from f1) having at least two groups reactive with isocyanate, with a molecular weight of 60 to 400, the sum of the components f1) and f2) being 100 wt. %, with g) at least one compounds with two groups reactive with isocyanate and at least one anionic group or a group that will form anions, the component g) being able to be used separately or in the form of a reaction product g1) of component g) and one or more organic diisocyanates g2), the molar ratio of the groups of g) reactive with isocyanate groups to the isocyanate groups of g2) being 1:1.5 to 1:2.5, and the reaction product g1) being prepared in the presence of component f), and the component g) or the reaction product g1) being used in such an amount that the prepared polyurethane resins have the desired acid value, and h) one or more polyisocyanates with at least two free isocyanate groups per molecule, in such an amount that the molar ratio of the OH groups of component f) to the NCO groups of the components g) and h) is 1.01:1 to 3:1, following which the prepolymer obtained from f), g) and h) is, before or after the partial or complete neutralisation of existing groups that will convert into ionic groups, subjected to a chain extension in the organic medium or after conversion into the aqueous phase, by reaction with i) one or more polyfunctional isocyanates having a functionality of free NCO groups of at least 1.8, in such proportions that the prepared polyurethane resins have the desired number average molecular weight, the weight percentages of components A) and B) in each case referring to the resin solids and making up 100%.

2. A binder dispersion according to claim 1, wherein the component A) contains per 100 g of solid resin at least 200 milliequivalents of carbonate groups of the formula —O—CO—O—.

3. A binder dispersion according to claim 1 wherein it contains 40 to 60 wt. % of A) and 40 to 60 wt. % of B), the total amounting to 100 wt. %.

4. An aqueous coating agent comprising

8–20 wt. % of one or more binder dispersions according to claim 1, 50 to 90 wt. % of water, 0.1 to 20 wt. % of one or more effect pigments and/or colour-imparting pigments and/or fillers, the sum of the constituents amounting to 100 wt. %.

5. A method for the preparation of a base layer of a multi-layer lacquer comprising applying an aqueous coating agent of claim 4 to a substrate and drying the coating agent to form the base layer.

6. An aqueous binder dispersion according to claim 1 wherein the polyurethane resin component B) is free of urea groups.

7. An aqueous binder dispersion according to claim 1 wherein the polyester polyol component f1) is free of carboxylic acid groups.

8. An aqueous coating agent according to claim 4 further comprising up to 20 wt. % of one or more organic solvents and the sum of the constituents includes the organic solvents.

9. An aqueous coating agent according to claim 4 further comprising one or more additives or auxiliary substances, and the sum of the constituents includes the additives or auxiliary substances.

* * * * *